L. O. HENGGI.

CREEP CHECK.

APPLICATION FILED JUNE 7, 1922.

Reissued July 25, 1922. 15,421.

Inventor

Lewis O. Henggi,

By Barnett & Truman,

Attorneys

UNITED STATES PATENT OFFICE.

LEWIS O. HENGGI, OF OAKMONT, PENNSYLVANIA, ASSIGNOR TO THE P. & M. COMPANY, OF CHICAGO, ILLINOIS, A CORPORATION OF ILLINOIS.

CREEP CHECK.

15,421. Specification of Reissued Letters Patent. Reissued July 25, 1922.

Original No. 1,167,299, dated January 4, 1916, Serial No. 46,255, filed August 19, 1915. Continuation in part of application Serial No. 825,244, filed March 17, 1914. Application for reissue filed June 7, 1922. Serial No. 566,538.

*To all whom it may concern:*

Be it known that I, LEWIS O. HENGGI, a citizen of the United States, and a resident of Oakmont, in the county of Allegheny and State of Pennsylvania, have invented a new and useful Improvement in Creep Checks; and I do hereby declare the following to be a full, clear, and exact description thereof.

My invention pertains to creep-checks, that is to say devices for preventing railroad rails from creeping longitudinally of the tracks.

It is one of the objects of my invention to produce a creep-check which will be easy of manufacture and which will retain its position on the rail and perform its functions, regardless of weather changes, vibration and jarring of the rails, etc.

It is another object of my invention to provide a creep-check in which the work required in applying it to a rail, or removing it from a rail, will be a minimum.

Other and further objects of the invention will appear from the following specification, taken in connection with the appended claims.

Figure 1:
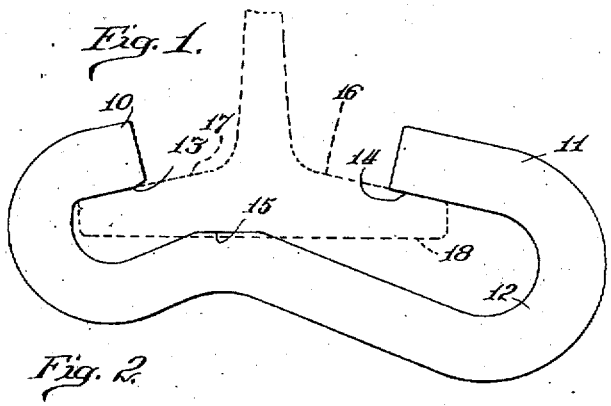
Figure 2:
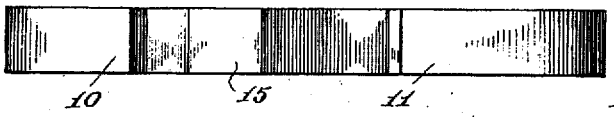
Figure 3:
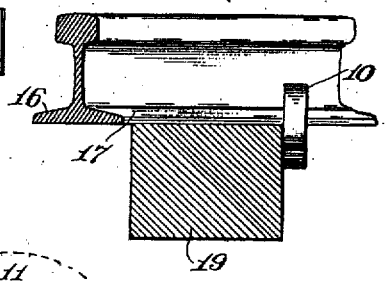
Figure 4:
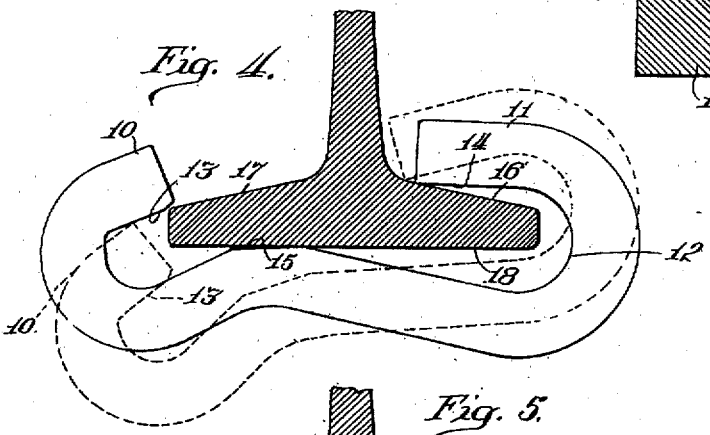
Figure 5:
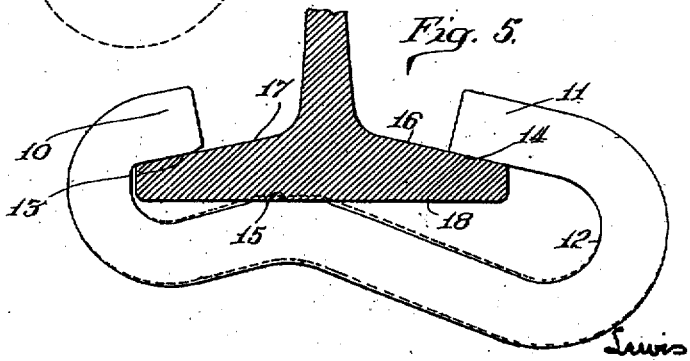

In order that my invention may be fully understood, I have described, by way of example, one embodiment thereof in the following specification, and shown the same in the accompanying drawing, in which:

Figure 1 is a side elevation of a creep-check constructed in accordance with my invention; Fig. 2 is a plan of the same; Fig. 3 is an end view of the creep-check, showing the same applied to a rail; Fig. 4 is a side elevation showing, in broken lines, one step in applying the creep-check to a rail base, and in full lines, a succeeding step; and Fig. 5 is a side elevation showing the creep-check in place on the rail base.

Like reference characters refer to like parts throughout the following specification and the several figures of the drawing.

The form of creep-check shown in the drawing consists of a steel bar, rectangular in cross-section, the ends of which are bent over to form hook-shaped jaws 10 and 11 respectively. The jaw 11 is substantially twice as long as the jaw 10, and its open portion 12 is somewhat wider than that of the jaw 10. The inner surfaces 13 and 14 of the jaws 10 and 11 approach each other at substantially the same angle as the top surfaces of the rail base approach each other. That is to say, when the creep-check is to be used with a 13 degree rail base, the jaw surfaces 13 and 14 approach each other at substantially 174 degrees. Intermediate its ends, and nearer the jaw 10 than the jaw 11, the body portion of the creep-check is bent inwardly so as to form a seat 15. The proportions and shape are such that the seat 15 will be within the line which would be formed by the bottom surface of the rail base, if the top surfaces of the rail base be made to coincide with the jaw surfaces 13 and 14. This will be readily understood from Fig. 1, in which a rail base is indicated in dotted lines, 16 and 17 designating right and left hand top surfaces respectively, and 18 designating the bottom surface. It will be seen that with the jaw surfaces 13 and 14 coinciding with the rail base surfaces 16 and 17, the creep-check seat 15 is within the line formed by the rail base bottom surface 18. The seat 15 is also substantially parallel with the line formed by the surface 18. In other words, for a 13 degree rail, the seat 15 is disposed at an angle of substantially 13 degrees with respect to the jaw surfaces 13 and 14.

In applying the creep-check to a rail, the end jaw 11 is first hooked over the rail base, so that its end engages with the top of one of the upper base surfaces, in the drawing the surface 16 (broken lines Fig. 4). The creep-check is then swung upwardly until its seat 15 engages against the rail surface 18 and the end of the jaw 10 engages the bottom part of the rail surface 17 (full lines Fig. 4). It will be seen that the jaw 10 cannot be moved, from the position of preliminary engagement shown in Fig. 4, farther up the rail base without distortion of the creep-check by reason of the fact that the jaws 10 and 11 have a differential leverage on the upper faces of the rail flanges with respect to the intermediate bearing or seat 15 acting as a fulcrum. As will be readily understood, when the device as a whole rocks upon the seat 15 as a bearing or fulcrum, the end of the jaw 11 will normally move a greater distance than will the end of the jaw 10 by reason of the fact that the jaw 11 is disposed at a greater distance from such fulcrum. The slope of the upper faces of the flanges is, however, the same at both sides of the rail whereby the jaw 11 is permitted to move downwardly only the same distance as the jaw 10 moves upwardly, with the result that the movement of the device toward the right in Fig. 4 into normal position as shown in Fig. 1 causes a material distortion of the creep-check, the bearing 15 being displaced downwardly with respect to the end jaws.

The operation of applying the creep-check is completed by driving the jaw 10 upward on the rail base by means of a sledge hammer or the like, the final position of the creep-check being as shown in Fig. 5. The broken lines in Fig. 5 indicate the original shape of the creep-check; and it will be seen that, in driving the jaw 10 onto the rail base, the metal of the creep-check has been strained apart. The tendency of the creep-check to return to its original shape results in an extremely strong gripping action on the rail base, such gripping action being more than sufficient to hold the creep-check in position in spite of any vibration to which the rail may be subjected, and in spite of weather changes or the like.

The creep-check is placed in position so as to abut against a tie, designated 19 in Fig. 3, at that side of the tie which is opposed to the direction in which the rail will tend to creep. By its engagement with the tie, the creep-check prevents any longitudinal movement of the rail.

The creep-check described above is extremely simple and easy of manufacture. It can be applied to a rail base in less than a minute, and can be removed equally quickly by striking the end 11 of the creep-check with a sledge hammer or the like. After having been thus removed, the creep-check can be used over again, if desired. When once applied to a rail base, there is no liability of the creep-check to become loose or to shift endwise on the rail.

While I prefer to use the form of device illustrated in which the jaw 10 is so disposed as to be capable of preliminary engagement as shown in Fig. 4 without distortion of the device, I wish to have it understood that I do not desire to be limited to this construction except as hereinafter specifically claimed.

By my invention, I have provided an anti-creeper which can be applied transversely to a rail from one side thereof directly along one face of a cross-tie without the necessity of any one of the three bearing portions having any movement longitudinally of the rail either during the application of the device to a rail or after such application. This is of considerable importance as affecting the ability of the device to grip without movement longitudinally of the rail when in use, and my claims are to be construed accordingly.

While I have described in the foregoing specification one form of creep-check embodying my invention, I wish it understood that changes may be made in the details thereof without exceeding the scope of the invention as defined in the appended claims.

Claims:

1. An anti-creeper for rails comprising a body and inwardly extending jaws so arranged that lateral clearance is provided for applying the device transversely to a rail with the body contacting with the bottom face and with the jaws in preliminary engagement with the upper faces of the flanges of the rail, and so arranged that the device is movable in right lines transversely of the rail from its position of preliminary engagement into its operative engaging position and is thereby forced into strong gripping engagement.

2. An anti-creeper for rails comprising a body and end jaws extending inwardly substantially in the plane with the body, being so arranged that clearance is provided for applying the device without distortion to a rail with the body extending across the bottom face and with the jaws in preliminary engagement with the upper faces of the flanges, the parts being so positioned and proportioned that upon transverse movement of the device upon the rail into its operative engaging position the device is forced into strong gripping engagement.

3. In an anti-creeper, a body having a portion disposed so as to bear against the bottom of the rail base, and a pair of terminal jaws differentially disposed laterally of the rail with relation to the effective bearing of the body on the base so as to rigidly engage the top of the rail base when said body is forcibly moved transversely of said rail base and thereby retain the anti-creeper in position upon the rail base.

4. An anti-creeper for rails comprising a body and end jaws formed integrally with the body and extending inwardly toward each other, one of said jaws being formed to provide clearance for permitting the device to be applied transversely of the rail into preliminary position at right angles with respect to the rail along one face of a cross tie without springing the jaws outwardly with respect to each other, the arrangement and proportions of the parts being such that a forcible transverse movement of the device from its preliminary to its operative position causes the device to have a strong gripping engagement with the rail.

5. An anti-creeper for rails comprising a body and end jaws formed integrally with the body and extending inwardly toward each other, one of said jaws being formed to provide clearance for permitting the device to be applied transversely of the rail into preliminary position thereon, the arrangement of the bearing portions of the jaws with respect to the bearing portion of the body being such that a differential leverage is established serving upon transverse movement of the device to tighten the jaws and the body upon the rail.

6. An anti-creeper for rails including a bowed body member having an intermediate bearing projection engageable with the bottom face of a rail base, and terminal gripping jaws formed on the body member for securing said anti-creeper to the rail base, said terminal jaws being so disposed with relation to the bearing projection as to be tightened upon the upper faces of the rail flanges by movement together in the same direction transversely of the rail.

7. A creep-check comprising a member formed intermediate its ends with a seat portion for engaging the bottom surface of the rail base and bent to form end jaws for engaging the top surfaces of the rail base on either side of the rail, thereby to secure the creep check to the rail base, one of said jaws being extended outwardly to form an interior clearance to permit the preliminary positioning of said jaws and said seat portion on the rail base, and said seat being so disposed with relation to said jaws as to necessitate distortion of the creep check for movement of the device from preliminary position to operative engagement.

8. A creep-check comprising a member having the ends thereof bent to form a body portion and end jaws for engaging the top surfaces of the rail base thereby to secure the creep-check to the rail base, one of said jaws being extended outwardly to provide an interior clearance to permit the preliminary positioning of the member on said rail base, said body portion being formed, intermediate its ends and at the side of its center remote from said extended jaw, with a seat for engaging against the bottom surface of the rail base, and said jaws and seat being disposed so as to necessitate distortion of the creep-check to allow operative engagement.

9. An anti-creeper comprising a body pressing upwardly at an intermediate bearing point on the bottom of a rail when applied in operative position thereto, and jaws pressing downwardly on the flanges, the parts being so disposed and proportioned that the device in its application to the rail is tightened thereon by transverse movement with respect thereto by reason of a differential leverage of the end jaws upon the intermediate bearing acting as a fulcrum.

10. An anti-creeper comprising a body pressing upwardly at an intermediate bearing point on the bottom of a rail when applied in operative position thereon, a jaw pressing downwardly on the sloping upper face of one of the flanges, and a second jaw pressing downwardly on the sloping upper face of the other flange at a shorter distance from the intermediate bearing point than the distance between said intermediate bearing point and the closest bearing portion of said first named jaw.

11. A one-piece anti-creeper comprising a body pressing upwardly on the bottom of a rail when applied in operative position thereto by means of a bearing of only comparatively small scope transversely of the rail, and end jaws extending inwardly substantially in the same plane with the body and serving by heavy downward pressure on the rail flanges to cause the device very strongly to grip the rail independently of any pressure on either face of the body longitudinally of the rail.

12. An anti-creeper comprising a body pressing upwardly by direct contact on the bottom of a rail when applied in operative position thereto by means of an intermediate bearing of only comparatively small scope transversely of the rail, and end jaws extending inwardly substantially in the plane with the body and serving by heavy downward pressure on the rail flanges to cause the device very strongly to grip the rail independently of any pressure on either face of the body longitudinally of the rail, the arrangement being such that the device is tightened upon the rail in its application thereto by displacement of the intermediate bearing downwardly with respect to the end jaws.

13. An anti-creeper comprising a body pressing upwardly by direct contact on the bottom of the rail when applied in operative position thereto by means of a bearing of only comparatively small scope transversely of the rail, and end jaws extending inwardly substantially in the plane with the body and serving by direct engagement with the upper faces of the flanges of the rail to apply heavy pressure thereto for causing the device very strongly to grip the rail independently of any pressure on either face of the body longitudinally of the rail.

14. An anti-creeper comprising a body bowed upwardly for providing an intermediate bearing for the bottom of the rail, and end jaws formed integrally with said body and extending in the same plane therewith adapted to have direct engagement with the upper faces of the flanges of the rail, the arrangement being such that with one jaw loosely engaging the upper face of one flange in the application of the device to a rail, the other jaw is free to rise to bring its engaging face substantially into alignment with the upper face of the other flange and that when said other jaw is moved into full operative engagement, said intermediate bearing is displaced downwardly with respect to said end jaws for causing the device to have a strong gripping engagement with the rail.

15. An anti-creeper comprising a body and end jaws formed integrally therewith, each of said end jaws being so disposed with clearance with relation to the body that it is incapable by itself in cooperation with the body to have gripping engagement with a rail flange, said two end jaws acting together being adapted by direct engagement with the upper faces of the flanges of the rail to grip the rail between them and the body of the device extending across the bottom of the rail.

16. An anti-creeper comprising a body and end jaws formed integrally therewith and in the same plane therewith, each of said jaws being so disposed with clearance with relation to the body that it is incapable by itself in cooperation with the body to have gripping engagement with the rail flange, said two end jaws acting together being adapted by direct engagement with the upper faces of the flanges of the rail to grip the rail between them and the body of the device extending across the bottom of the rail.

17. A one piece anti-creeper formed of a substantially rigid bar of resilient metal, bent to form a large jaw at one end, a smaller jaw at the other end, and an intermediate bowed position, all so formed and related that the large jaw may be slipped laterally over the rail base and then by distorting the device the small jaw may be fitted over the opposite side of the rail base.

18. An anti-creeper of one piece of resilient metal formed to provide a gripping jaw at each end with an intermediate upwardly bowed portion, the depth of one jaw being sufficient to permit the device to be applied laterally on a rail base so as to permit the other jaw to clear the opposite edge of the rail base and then by distortion of the device to be slid over such opposite edge of the base whereby the rail will be gripped with spring tension between said jaws and said intermediate portion.

19. An anti-creeper of one piece of resilient metal formed to provide a gripping jaw at each end with an intermediate upwardly bowed portion, one of said jaws having clearance for permitting it to be applied laterally to one flange of a rail so as to permit the other jaw to clear the opposite edge of the rail base, the arrangement of the jaws with relation to the intermediate bowed portion being such that clearance is provided for permitting free movement of the device laterally a short distance in the reverse direction sufficiently for securing preliminary engagement of the said other jaw with the opposite edge of the rail base, and such that by continued lateral movement in the said reverse direction the device is distorted for causing it to have effective gripping engagement with the base.

20. An anti-creeper of one piece of resilient metal formed to provide a gripping jaw at each end with an intermediate upwardly bowed portion, one of said jaws having clearance for permitting it to be applied laterally to one flange of a rail so as to permit the other jaw to clear the opposite edge of the rail base, the arrangement of the jaws with relation to the intermediate bowed portion being such that clearance is provided for permitting free movement of the device laterally a short distance in the reverse direction sufficiently for securing preliminary engagement of the said other jaw with the opposite edge of the rail base, said jaws being differentially arranged laterally of the rail with respect to said intermediate bowed portion whereby upon continued lateral movement of the device in the said reverse direction, the device is distorted so as to have effective gripping engagement with the base.

LEWIS O. HENGGI.

Certificate of Correction.

It is hereby certified that in Reissue Letters Patent No. 15,421, granted July 25, 1922, upon the application of Lewis O. Henggi, of Oakmont, Pennsylvania, for an improvement in "Creep Checks," an error appears in the printed specification requiring correction as follows: Page 4, line 32, claim 17, for the word "position" read *portion;* and that the said Letters Patent should be read with this correction therein that the same may conform to the record of the case in the Patent Office.

Signed and sealed this 17th day of October, A. D., 1922.

[SEAL.] KARL FENNING,

*Assistant Commissioner of Patents.*